United States Patent Office 3,217,835
Patented Nov. 16, 1965

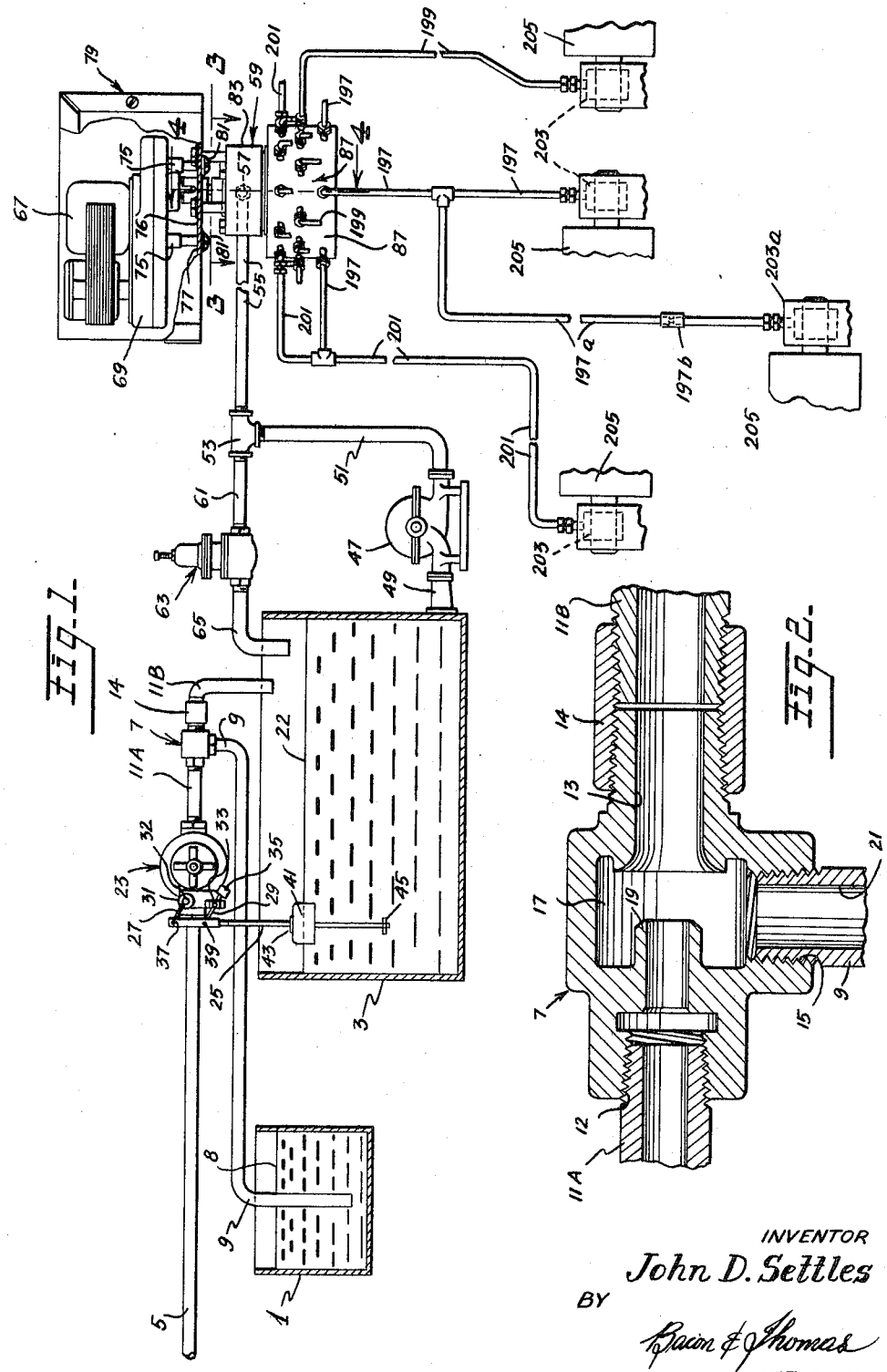

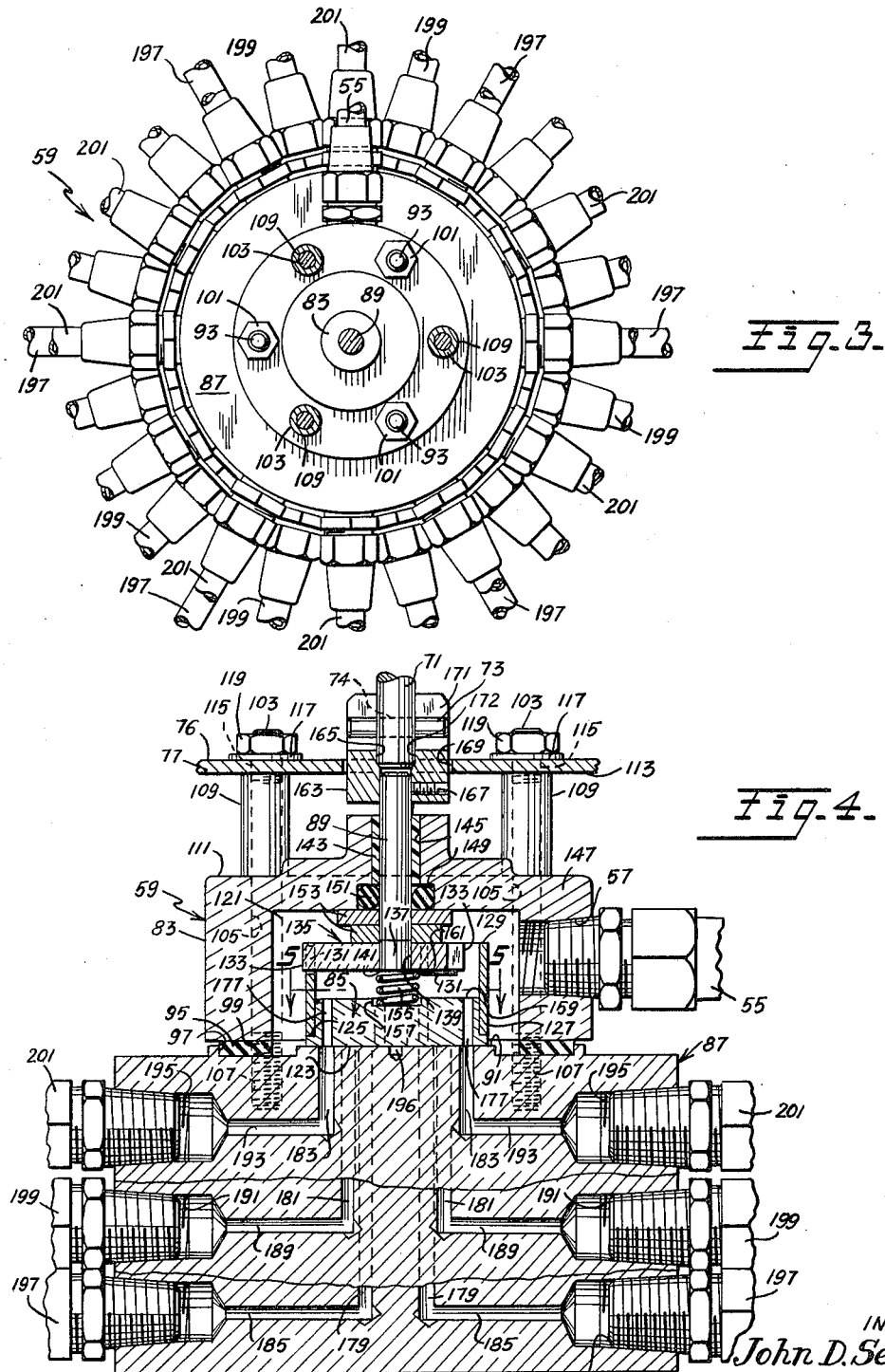

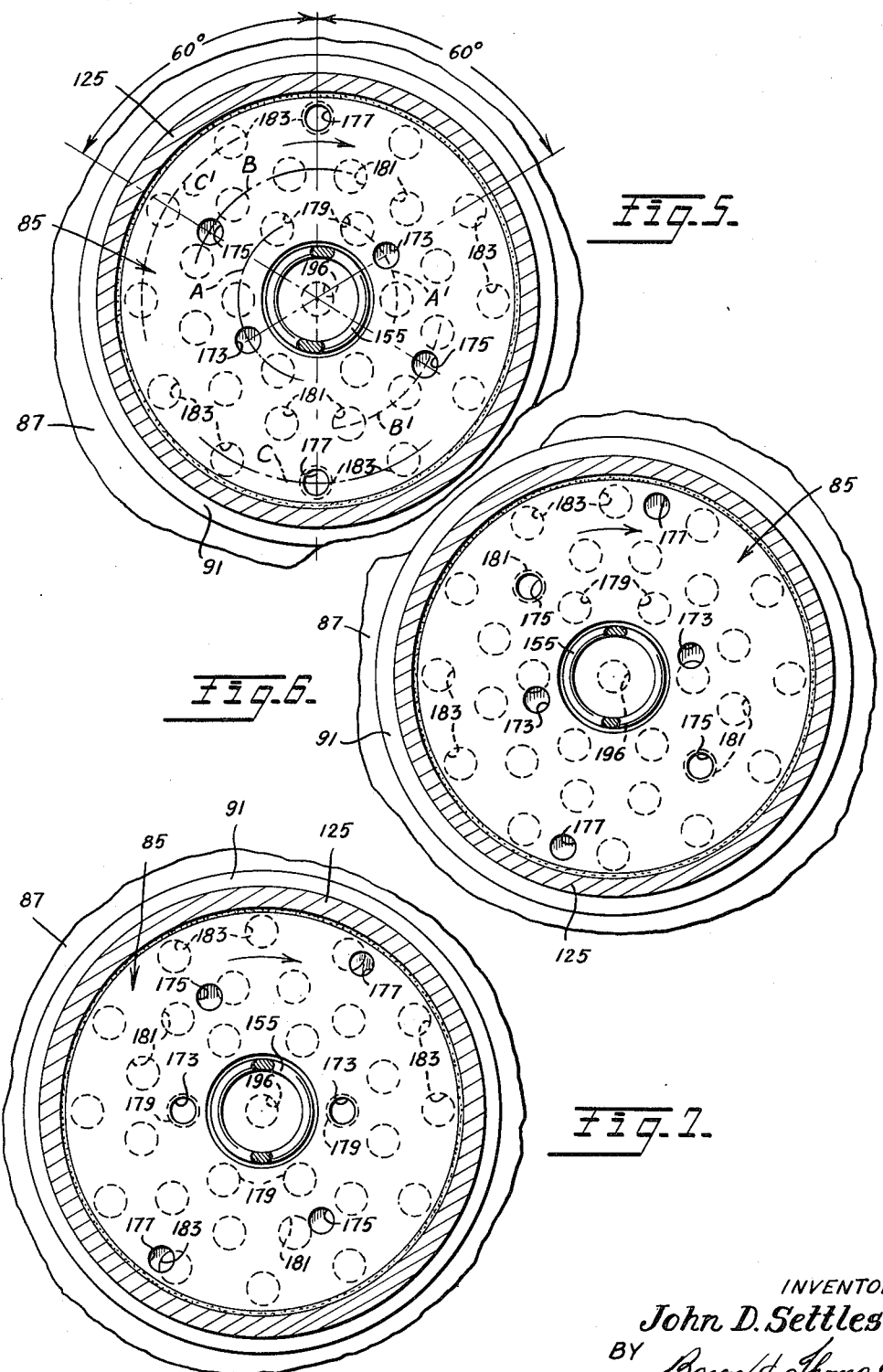

3,217,835
MULTIPLE LUBRICATION CONTROL
John D. Settles, Garden Grove, Calif., assignor to
Donald G. Griswold, Newport Beach, Calif.
Filed Oct. 8, 1962, Ser. No. 229,144
14 Claims. (Cl. 184—7)

This invention relates to a lubricating system including a new and improved control valve for effecting automatic, periodic, distribution of lubricant under pressure to a plurality of parts, in the precise amount required for adequate lubrication of said parts.

The present invention fills a need for a completely automatic and positive system for periodically distributing lubricant in the exact amount required to various parts of mechanical apparatus, for example, for lubricating chains, wheels, pulleys and bearings associated with conveyors and other mechanisms. In certain industries, such as in bottling plants, for example, a great many conveyors of various types and sizes are employed. It is necessary to frequently apply the proper amount of lubricant to the various parts of these conveyors in order to prevent damage thereto from incidentals, including water and other foreign material. Proper lubrication also primarily reduces the frictional wear on the conveyors, and thus results in a longer useful life, a reduction in the cost of maintenance, and a reduction in the amount of power required to drive the apparatus.

In the present multiple lubrication control system, lubricant is supplied under pressure to a control valve housing. A rotary, disc-type valve, which is positioned in the control housing and rotated by a constant speed motor, distributes small amounts of lubricant into a multi-port distributor body. A number of small tubes for conducting lubricant (thirty being shown herein), are connected between the distributor and the parts to be lubricated. By employing small tubes, lubricant can be easily furnished to parts in locations which would normally be difficult or impossible to reach otherwise.

The lubricant distribution control valve includes a novel porting arrangement, which provides for virtually unlimited flexibility in supplying varying volumes of lubricant to meet varying lubrication requirements of parts in the same device. The arrangement of the ports in the rotary valve and in the distributor body provides for the distribution of lubricant in various quantities and at predetermined frequencies through selected tubes. This arrangement includes the location of the ports of both the rotary valve and the distribution body on a plurality of matching concentric circles. The ports in the rotary valve are diametrically arranged in such a manner that each of the tubes connected to the distributor body receives two charges of the lubricant for each revolution of the rotary valve. In addition to the variations resulting from the novel porting arrangement, further variations in the volume or the quantity of the charge of lubricant furnished to a given part may be provided by interconnecting two or more of the tubes, or by providing selected tubes with any desired number of branch conduits. Other variations may be obtained by varying the number and position of the ports in the distributor body and in the rotary valve, varying the speed of rotation of the valve, changing the size of the lubricant passages, and by others means.

Heretofore, it has been the conventional practice either to apply lubricant manually to each bearing or other portion of a device, such as a conveyor, or to manually control the supply and distribution of lubricant from pans to the various parts. This procedure is unreliable and has a great many disadvantages which are obviated by the present invention.

The principal object of this invention is to provide a multiple lubrication control system which is dependable, automatic in operation, trouble-free, and economical to manufacture and install.

Another object is to provide a multiple lubrication control system designed to distribute liquid lubricant precisely and accurately in varying amounts through different tubes for lubricating the moving parts of conveyors and like mechanism.

Another object is to provide a multiple lubricant control designed to periodically furnish the exact amount of lubricant needed for lubricating a plurality of machine parts.

Another object is to provide a lubricant distribution control valve having a novel porting arrangement especially designed for use in a multiple lubricating system.

Another object is to provide a cyclically operating multiple lubrication control device constructed and arranged to distribute lubricant in different amounts through various ports during each cycle of the device.

The foregoing and other objects of the invention will become more apparent from the following description when taken in conjunction with the accompanying drawings, in which:

FIG. 1 is a schematic view showing the present multiple automatic control incorporated in a lubricating system;

FIG. 2 is an enlarged, fragmentary, vertical sectional view of an ejector device employed in the system for mixing concentrated liquid lubricant with water;

FIG. 3 is an enlarged, fragmentary, horizontal sectional plan view of the lubricant distribution control device taken on line 3—3 of FIG. 1;

FIG. 4 is an enlarged, fragmentary, vertical sectional view through the lubricant distribution control device, taken on line 4—4 of FIG. 1;

FIG. 5 is an enlarged, fragmentary, sectional view, taken on line 5—5 of FIG. 4, showing the relative position of tne ports in the rotary valve and in the distributor body when the ports on the outermost circles of both are aligned;

FIG. 6 is a view similar to FIG. 5, but showing the relative position of the ports in the rotary valve and in the distributor body when the ports on the intermediate circles of both are in alignment, and FIG. 7 is a view similar to FIG. 5, but showing the relative position of the ports in the rotary valve and in the distributor body when the ports on the inner circles of both are in alignment.

The lubricating system illustrated in FIG. 1 includes a tank or receptacle 1 for holding a supply of concentrated liquid lubricant, and a relatively larger tank or receptacle 3 for holding a supply of the liquid lubricant mixed with a proper amount of water.

Water under pressure is supplied to the system through an inlet conduit 5 to float valve 23, then through an ejector 7 of conventional construction for withdrawing concentrated liquid lubricant 8 from receptacle 1 through a conduit 9 and discharging the resultant mixture through an outlet 11B. The conduit 5 is threaded into the inlet opening of float valve 23, FIG. 1. Conduit 11A is connected to the outlet opening of float valve 23, and to inlet opening 12 of the ejector 7. The conduit 9 is disposed with the lower end thereof adjacent the bottom of receptacle 1, and with the upper end thereof threaded into an opening 15 formed in a side wall of an enlarged chamber 17 within the ejector 7. Chamber 17 extends around an ejector nozzle 19 and forms a low pressure chamber for drawing fluid into the ejector 7. The size of the passage 21 in conduit 9 is such that the flow of water under pressure through the ejector 7 will suck the proper amount of lubricant concentrate from receptacle 1 into chamber 17 to provide a mixture of lubricant and water of the desired concentration. The concentrated liquid lubricant and water 22 is intimately mixed by the turbulence created in the ejector 7 and is discharged from the ejector into conduit 11B.

The level of the lubricant mixture 22 in receptacle 3 is controlled by a float-actuated, diaphragm type shut-off valve 23 connected in conduit 5. An actuating rod 25 is mounted upon valve 23 by upper and lower parallel links 27 and 29, respectively. Upper link 27 is connected at one end 31 thereof to a pilot valve 32, which controls the opening and closing of valve 23. The pilot valve 32 may be of the type disclosed in Patent 2,243,815. The lower link 29 is pivotally connected intermediate its ends to the valve housing, as at 33, at a point disposed vertically below the point of connection 31. The end of lower link 29, which is disposed nearest valve 23, is provided with an adjustable counterweight 35. The left end of the upper and lower parallel links 27 and 29 are pivotally connected to the upper portion of actuating rod 25, at 37 and 39, respectively. By means of this parallel linkage arrangement, actuating rod 25 is maintained in a vertical position as it is raised and lowered to actuate shut-off valve 23, as described below.

A float 41 is slideably mounted upon the lower portion of actuating rod 25 for movement between upper and lower stops 43 and 45, respectively. The stops 43 and 45 are adjustably mounted on actuating rod 25 to limit the movement of float 41 thereon. As the level of the lubricant mixture 22 in receptacle 3 is lowered, float 41 will descend until it comes into contact with stop 45. Counterweight 35 is so adjusted on lower link 29 that the weight of float 41 and its associated linkage will be sufficient to move actuating rod 25 downwardly to actuate the pilot valve 32 to effect operation of valve 23 from closed to open position, and thus permit water to flow through conduit 11A, through ejector 7, mixing with the liquid lubricant at this point, then through conduit 11B into receptacle 3. As the level of the lubricant mixture 22 in receptacle 3 rises, float 41 will slide upwardly on actuating rod 25 until it contacts upper stop 43. Continued upward movement of float 41 will move actuating rod 25 upwardly to actuate pilot valve 32 to effect operation of valve 23 from open to closed position to shut off the flow of lubricant mixture into receptacle 3.

The lubricant mixture 22 in receptacle 3 is withdrawn therefrom by a pump 47 having the inlet thereof connected by a conduit 49 to receptacle 3 adjacent the bottom thereof. While pump 47 is shown as being of the centrifugal type, any other type of pump which is suitable for pumping liquid could be employed. The outlet of pump 47 is connected through conduit 51, T-fitting 53 and conduit 55 to a threaded inlet opening 57 of a rotary control valve, generally indicated at 59. In the event that no lubricant is flowing through the control valve 59, and to maintain constant pressure at inlet openings 57, the discharge of pump 47 is returned to receptacle 3 through conduit 61, which is connected to T-fitting 53, and through a pressure relief valve 63 and discharge conduit 65.

The mechanism for rotating a disc assembly (described in detail hereinafter) within the control valve 59 is schematically illustrated in FIG. 1 and includes a constant speed motor 67, mounted upon a reduction gear housing 69. As is conventional, the drive shaft of motor 67, not shown, is operably connected to the input of conventional reduction gearing, not shown, in housing 69. The output shaft 71, FIG. 4, of the reduction gearing is adapted to be rotated at a relatively slow speed, for example, 12 revolutions per minute. A drive pin 73 is press-fitted into a transversely extending opening 74, formed in output shaft 71 adjacent the lower end thereof. The constant speed motor 67 and housing 69 are supported on legs 75, FIG. 1, extending downwardly from the bottom of gear housing 69 and resting upon the upper surface 76 of a flat plate 77, which forms the bottom wall of an enclosure 79 containing the motor and gearing. Threaded bolts 81 extend through suitable openings in plate 77 and into threaded openings in the lower ends of legs 75 to secure motor 67 and housing 69 to plate 77.

As best illustrated in FIG. 4, the lubricant control valve 59 includes a housing 83, containing a rotary disc-type valve 85, mounted upon a distributor body 87. The rotary valve 85 is adapted to be rotated by a shaft 89, and is engaged with a seat 91 formed on distributor body 87. The housing 83 is secured to the distributor body 87 by three equally spaced, threaded studs 93, FIG. 3, which extend through suitable openings, not shown, formed in control housing 83, and into threaded openings, not shown, formed in the upper portion of distributor body 87. A resilient gasket 95 is seated in an annular recess 97 provided in the upper surface of distributor body 87 and disposed between the upper surface of the body and the lower surface 99 of housing 83 to provide a seal therebetween to prevent the leakage of fluid. Threaded nuts 101 are mounted on studs 93 to securely fasten the housing 83 onto the distributor body 87.

The assembled control valve 59 is mounted upon plate 77 by three threaded studs 103, FIG. 4, which pass through openings 105 formed in housing 83 and into threaded openings 107 provided in the upper portion of distributor body 87. Tubular spacers 109 are positioned around studs 103 between the upper surface 111 of housing 83 and the lower surface 113 of plate 77, to space the housing from the plate. The upper ends of studs 103 pass through suitable openings 115 formed in plate 77 and through washers 117. Threaded nuts 119, mounted on studs 103 above plate 77, seat on washers 117 to fasten the control valve 59 onto plate 77.

It will be understood that the studs 93, referred to hereinbefore, extend through openings in the housing 83 similar to the openings 105, and into threaded openings in the distributor body 87 similar to the openings 107.

The housing 83 contains a chamber 121 extending inwardly from the lower surface 99 thereof to enclose the rotary valve 85 and to receive the liquid lubricant mixture supplied thereto through conduit 55. The lower face 123 of rotary valve 85 engages the seat 91 on the upper surface of distributor body 87 and cooperates therewith to function as a lubricant distributing valve. A radially extending shoulder 125, formed on the periphery of rotary valve 85 provides an abutment for skirt 127, which is secured to the outer periphery of rotary valve 85, as by brazing or soldering. The upper extremity 129 of skirt 127 is formed with three inwardly extending openings 131 to receive therein radially extending legs 133 of a driver 135. Shaft 89 is splined, as at 137, at the lower end thereof, and is forced into an opening 139 formed at the center of driver 135 to connect the shaft and driver together for simultaneous rotation. Shafts 89 may be riveted over or upset as at 141 at the lower end thereof to retain the driver thereon.

The central portion of driver 135 forms a hub for the radially extending legs 133 and is spaced from skirt 127, permitting fluid to pass therebetween. Shafts 89 passes upwardly through a bushing 143, which is press-fitted into an opening 145 extending through an upper wall 147 of housing 83. A counterbore 149, formed at the lower end of opening 145, receives an O-ring packing 151. A pair of washers 153 is mounted on shaft 89 between driver 135 and O-ring 151 to compress the O-ring into contact with shaft 89 and with the walls of counterbore 149 to provide a fluid-tight seal against the escape of the liquid lubricant from chamber 121. A coiled compression spring 155, having one end seated in a recess 157 formed in the upper surface 159 of rotary valve 85 and the other end bearing against the lower surface 161 of driver 135, urges the rotary valve into contact with the seat 91 of distributor body 87 and urges driver 135, together with washers 153 upwardly into contact with O-ring 151 to compress the O-ring.

A coupling 163, having an opening 165 formed therein, is mounted on the upper end of shaft 89 and is secured thereon by a threaded set screw 167. Coupling 163 extends through an opening 169 in plate 77, and is provided at the upper end thereof with a diametrically extending slot 171 having substantially the same width as drive pin 73. The lower end of output shaft 71 and drive pin 73 are disposed in coupling 163 for rotating the valve disc 85. The upper end of opening 165 is enlarged at 172 to receive the lower end of output shaft 71 in order to axially align shafts 71 and 89.

The valve disc 85, FIG. 5, is provided with a plurality of pairs of ports or passages extending therethrough from the lower seating face 123 to the upper surface 159 thereof. The lower end of the passages is arranged in seating face 123 of valve disc 85 to provide a first pair of passages 173, diametrically disposed on an inner circle A, a second pair of passages 175 diametrically disposed on an intermediate circle B positioned radially outwardly and concentric with the inner circle A, and a third pair of passages 177 diametrically disposed on an outer circle C concentric with and spaced radially outwardly from the intermediate circle B. The diametrically disposed pair of passages on each of the circles lie in radially extending planes, which are spaced 60 degrees apart.

The distributor body 87 is provided with a plurality of ports or passages, arranged on concentric circles A', B' and C' having the same diameter as the concentric circles A, B, and C, respectively of valve disc 85, adapted to cooperate with the passages formed in the seating face 123 of valve disc 85 when the valve disc is rotated. The passages formed in distributor body 87 extend inwardly from the seat surface 91 thereof, and are arranged to provide a first series of six equally spaced passages 179 arranged 60° apart on an inner circle A' having the same diameter as the inner circle A of valve disc 85, a second series of twelve equally spaced (30° apart) passages 181 concentric with and spaced radially outwardly of the first series of passages on a circle B' having the same diameter as the intermediate circle B of valve disc 85, and a third series of twelve equally spaced (30° apart) passages 183 concentric with and spaced radially outwardly of the second series of passages on a circle C' having the same diameter as the outer circle C of valve disc 85.

Passages 179 terminate adjacent the lower portion of distributor body 87 and are connected to radially extending passages 185, which terminate at the periphery of distributor body 87 in threaded counterbores 187. Passages 181 extend to a depth approximately midway of the distributor body 87 and are connected to radially extending passages 189, which terminate at the outer periphery of distributing body 87 in threaded counterbores 191. Passages 183 extend into the upper portion of the distributor body 87 to a lesser depth and are connected to radially extending passages 193, which terminate at the periphery of distributor body 87 in threaded counterbores 195.

In order to distribute the liquid lubricant mixture from distributor body 87 to the parts to be lubricated, tubes 197, 199 and 201 are connected at one end by conventional fittings to the threaded counterbores 187, 191 and 195, respectively. The other end of each of the tubes 197, 199 and 201 may be connected to a different bearing 203, FIG. 1, of conveyor rolls 205, for example, or to any other moving parts which requires lubrication.

The volume of lubricant delivered to the bearings can be varied by interconnecting the tubes in various ways. For example, one tube 197 can be connected to the tube 201 to supplement the total quantity of lubricant delivered to its associated bearing. Alternatively, a branch tube 197a can be connected with a tube 197, so that two bearings 203 and 203a are supplied by a lubricant delivered to a single tube 197 connected with the distributor body 87. Additionally, the lubricant supplied through any tube can be further controlled by inserting a flow restrictor therein, such as the orifice type restrictor 197b inserted in tube 197a.

The passages 179 on the inner circle A' of the distributor body 87 and alternate passages 183 on the outer circle C' lie in common radial planes, while the passages 181 on the intermediate circle B' lie on radial planes which are spaced from the radial planes of the passages 179 and 183 on inner and outer circles A' and C', respectively. As is best illustrated in FIGS. 5, 6 and 7, each of the two passages 173—173, 175—175 and 177—177 on the circles A, B, C, respectively, of rotary valve 85 is adapted to be connected to each of the passages on the corresponding circles A', B' and C' of distributor body 87 twice during each revolution of valve disc 85, to permit the liquid lubricant in chamber 121 to flow therethrough into the passages communicating therewith in distributor body 87 and thence to the parts to be lubricated.

All of the passages formed in rotary valve 85 are shown to be of the same diameter, while all of the passages formed in distributor housing 87, which terminate in seat surface 91, are of the same diameter but slightly larger than those in rotary valve 85. As the valve 85 is rotated at a constant speed, each passage 173 in the inner circle A thereof will be in communication with each of the passages 179 on the corresponding inner circle A' of the distributor body for a predetermined length of time, thus permitting a fixed volume of liquid lubricant to pass through each passage 173 and into each of the passages 179 in distributor body. During one revolution of valve disc 85, each of the passages 179 in distributor body 87 is placed in communication with both of the passages 173 of the rotating valve. By this arrangement, each of the passages 179 receives two charges of liquid lubricant for each revolution of the valve disc 85.

Passages 175 on the intermediate circle B of valve disc 85 communicate with passages 181 on the intermediate circle B' of distributor body 87 in a like manner. However, as the diameter of the intermediate circle B of valve disc 85 is larger than the diameter of the inner circle A thereof, the peripheral speed of passages 175 on the intermediate circle B will be greater than that of passages 173 on the inner circle A and, therefore, passages 175 will be in communication with passages 181 for a shorter length of time than will be passages 173 with passages 179, resulting in a smaller volume of the liquid lubricant being received by passages 181 than was received by passages 179. In like manner, liquid lubricant flows through passages 177 in the outer circle C of the valve disc 85 and into cooperating passages 183 on the outer circle C' of passages in distributor body 87. However, as the peripheral speed of passages 177 is greater than that of passages 175, a smaller volume of liquid lubricant is received by passages 183 than is received by passages 181. By varying the number and size of the passages in valve disc 85 and in distributor body 87, and by arranging the passages in concentric circles of predetermined diameter, the volume of lubricant mixture flow through the passages in rotary valve 85 and into the passages in distributor body 87 may be varied within wide limits.

For example, by arranging the passages in valve disc 85, and distributor body 87 to be on relative concentric circles having diameters of .344, .516 and .688 inch, the volume of lubricant passing through valve disc 85 and into each of the passages in distributor body 87 will be in a ratio of approximately 5–3–2 for the respective circles. By forming passages 173, 175 and 177 in valve disc 85, $\frac{3}{64}$ of an inch diameter, and the passages 179, 181 and 183 in distributor body 87, $\frac{1}{16}$ of an inch in diameter, and rotating the valve 85 at 12 r.p.m., the volume of lubricant mixture to pass through the passages in the inner, intermediate and outer circles of valve 85 and into each of the corresponding passages in distributor body 87, was found, by actual measurement, to be approximately 50 cc., 30 cc., and 20 cc., respectively.

It will be noted that lubricant can also be supplied, with the present porting arrangement, simultaneously to passages 179 and 183 on circles A' and C' through ports 173 and 177, respectively, as illustrated in FIG. 7. Similarly, ports 173 and 175 can simultaneously supply lubricant to passages 179 and 181, respectively, as shown in FIG. 6, and ports 175 and 177 can simultaneously supply lubricant to passages 181 and 183, respectively, as is evident from FIG. 5. All of the foregoing possibilities increase the versatility of the present lubricant distribution control means.

As the different parts of mechanical devices require varying quantities of lubricant, the precise amount required by any part may be delivered thereto by the appropriate arrangement and size of passages in the rotary valve and in the distributor body, and by connecting the appropriate tube or tubes to the part in order to obtain the proper volume of liquid lubricant at the point to be lubricated.

While the preferred form of the invention is disclosed herein, it is to be understood that it is not to be limited to the details shown, and that various modifications and changes, which will occur to those skilled in the art, may be made without departing from the principles of the invention as encompassed by the broadest interpretation of the scope of the appended claims.

I claim:

1. A multiple control valve for effecting the automatic distribution of liquid lubricant to a plurality of parts to be lubricated, comprising: a distributor body having a plurality of passages extending therethrough from one surface thereof for receiving liquid lubricant to be distributed, said passages being arranged with one end thereof starting at said one surface and being disposed upon a plurality of concentric circles, each of said concentric circles outwardly of the innermost thereof having a substantially greater diameter than its adjacent inner concentric circle whereby the passage disposed on each of said circles are radially spaced a substantial distance from the passages disposed on adjacent circles; a rotary valve having a seating face rotatably mounted upon said one surface, said rotary valve having a plurality of ports extending therethrough from said seating face with at least one of said ports being disposed on a circle coinciding with each of said circles on which said passages are disposed; means providing a pressure chamber for lubricant enclosing said rotary valve, all of said ports opening into said pressure chamber to receive lubricant therefrom; means for rotating said rotary valve to successively place each port in communication with the passages disposed on its associated circle to thereby distribute lubricant from said chamber through said ports to said passages, the substantial radial spacing between the passages on adjacent ones of said concentric circles being effective for a given rotational speed of said rotary valve so that a port on a relatively inner circle will move across each of its associated passages at a substantially slower rate than a port on a relatively outer circle will move across each of its associated passages, whereby for a given rotational speed of said rotary valve and for ports of generally the same diameter a substantially larger quantity of lubricant will flow from said pressure chamber into the passages of said relatively inner circle than will flow into the passages of said relatively outer circle; and resilient means between said rotating means and said rotary valve for urging said seating face of said valve into engagement with said one body surface.

2. A multiple control valve for the automatic distribution of lubricant to a plurality of parts to be lubricated, comprising: a distributor body having a plurality of passages extending therethrough from a seat on one surface thereof for receiving lubricant to be distributed, said passages being arranged in said seat on at least two concentric circles, the outer one of said circles having a substantially greater diameter than the inner one thereof whereby the passages on said outer circle are radially spaced a substantial distance from the passages on said inner circle; a rotary valve having a seating face rotatably mounted upon said seat, said rotary valve having a plurality of pairs of ports, one pair for registering with each of said passages on said circles, each of said pairs of ports extending through said rotary valve from said seating face, and the remainder of said rotary valve in the region of said circles being imperforate; a closed chamber for lubricant under pressure enclosing said rotary valve, all of said ports opening into said chamber to receive lubricant therefrom; means for rotating said rotary valve to successively place each port in communication with the passages disposed on its associated circle to thereby distribute lubricant from said chamber to said passages, the substantial radial spacing between the passages on said inner circle and the passages on said outer circle being effective for a given rotational speed of said rotary valve so that each port on said inner circle will move across each of its associated passages at a rate slower than each port of said outer circle will move across each of its associated passages, whereby for a given rotational speed of said rotary valve and for ports of generally the same diameter a substantially larger quantity of lubricant will flow from said chamber into the passages of said inner circle than will flow into the passages of said outer circle; and resilient means between said rotating means and said rotary valve for urging said seating face into engagement with said seat.

3. A multiple control valve for the automatic distribution of lubricant to a plurality of parts to be lubricated, comprising: a distributor body having a seat provided with a plurality of passages leading therefrom and extending through said body for receiving lubricant to be distributed, said passages being arranged on said seat on three concentric circles, the passages on each of said circles being uniformly spaced apart, and each of the outer two of said concentric circles having a substantially greater diameter than its adjacent inner circle, whereby the passages disposed on each of said three circles are radially spaced a substantial distance from the passages disposed on the others of said circles; a rotary valve having a seating face rotatably mounted upon said seat, said rotary valve having three pairs of ports extending therethrough from said seating surface, a single pair of said ports being disposed on a circle coinciding with each of the circles on which said passages are disposed, and the remainder of said rotary valve in the region of said circles being imperforate; means providing a closed chamber for lubricant under pressure enclosing said rotary valve, all of said ports opening into said chamber; means for rotating said valve to successively place each port in communication with the passages disposed on its associated circle to thereby distribute lubricant to said passages, the substantial radial spacing between the passages on adjacent circles being effective for a given rotational speed of said rotary valve so that each port on a relatively inner circle will move across each of its associated passages at a rate substantially slower than each port on a relatively outer circle will move across each of its associated passages, whereby for a given rotational speed of said rotary valve and for ports of generally the same diameter a substantially larger quantity of lubricant will flow from said chamber into the passages of said relatively inner circle than will flow into the passages of said relatively outer circle; and resilient means between said rotating means and said rotary valve for urging said seating face into engagement with said seat.

4. A multiple control valve for the automatic distribution of liquid lubricant to a plurality of parts to be lubricated, comprising: a distributor body having a plurality of passages extending therethrough from one surface thereof for receiving lubricant to be distributed, said passages being arranged in equally spaced relation on said one surface on a plurality of concentric circles, the outer circle including a greater number of said passages than a circle disposed radially inwardly thereof, and each of said concentric circles outwardly of the innermost thereof having a substantially greater diameter than its adjacent inner concentric circle whereby the passages disposed on each of said circles are radially spaced a substantial distance from the passages disposed on adjacent circles; a rotary valve having a seating face rotatably mounted upon said one surface, said rotary valve having a pair of ports for registering with the passages on each of said circles, each of said pairs of ports extending through said rotary valve from said seating face with a single pair being disposed on a circle coinciding with each one of the circles on which said passages are disposed, the remainder of said rotary valve in the region of said circles being imperforate; means providing a closed chamber for liquid lubricant enclosing said rotary valve, all of said ports opening into said chamber for receiving lubricant therefrom; means for rotating said valve to successively place each port in communication with the passages disposed on its associated circle to thereby distribute lubricant to said passages, the substantial radial space between the passages on adjacent ones of said concentric circles being effective for a given rotational speed of said rotary valve so that each port on a relatively inner circle will move across each of its associated passages at a substantially slower rate than each port on a relatively outer circle will move across each of its associated passages, whereby for a given rotational speed of said rotary valve and for ports of generally the same diameter a substantially larger quantity of lubricant will flow from said chamber into the passages of said relatively inner circle than will flow into the passages of said relatively outer circle; and resilient means between said rotating means and said rotary valve for urging said seating face of said valve into engagement with said one body surface.

5. A multiple control valve for the automatic distribution of lubricant to a plurality of parts to be lubricated, comprising: a distributor body having a plurality of passages extending therethrough from one surface thereof for receiving lubricant to be distributed, said passages comprising, a first series opening into said one surface arranged in uniformly spaced apart relation on an inner circle; a second series opening into said one surface arranged in uniformly spaced apart relation on an intermediate circle concentric with said first circle, said intermediate circle having a diameter about one and one-half times the diameter of said inner circle, so that said passages on said intermediate circle are spaced radially a substantial distance from the passages on said inner circle, and a third series opening into said one surface arranged in uniformly spaced apart relation on an outer circle concentric with said intermediate circle, said outer circle having a diameter about twice the diameter of said inner circle, so that said passages on said outer circle are spaced radially a substantial distance from the passages on said intermediate circle; a rotary valve having a seating face rotatably mounted upon said one surface, said rotary valve having a plurality of ports extending therethrough from said seating face for cooperation with said passages in said distributor body, said ports in said rotary valve comprising, a first diametrically opposed pair on a circle having the same diameter as said inner circle, a second diametrically opposed pair on a circle having the same diameter as said intermediate circle, and a third diametrically opposed pair on a circle having the same diameter as said outer circle, the ports in each of said pairs lying in radial planes which are spaced 60 degrees apart, and the remainder of said rotary valve in the region of said circles being imperforate; means providing a closed chamber for lubricant under pressure enclosing said rotary valve, all of said ports opening into said chamber for receiving lubricant therefrom; means extending into said chamber for rotating said valve to successively place each port in communication with each of its associated passages to distribute lubricant to said passages, the substantial radial spacing between the passages on adjacent circles being effective for a given rotational speed of said rotary valve so that each port on a relatively inner circle will move across each of its associated passages at a rate substantially slower than each port on a relatively outer circle will move across each of its associated passages, whereby for a given rotational speed of said rotary valve and for ports of generally the same diameter a substantially larger quantity of lubricant will flow from said chamber into the passages of said relatively inner circle than will flow into the passages of said relatively outer circle; and resilient means between said rotating means and said rotary valve for urging said seating face of said valve into engagement with said one body surface.

6. A multiple control valve as defined in claim 5, wherein the outer end of each passage in said second series lies in a radial plane which is spaced from a radial plane passing through the outer end of each of said passages in said first and third series, with a greater number of passages in said second and third series than in said first series.

7. A multiple control valve a defined in claim 5, wherein the ports in the rotary valve are of uniform diameter and wherein the passages in the distributor body are of uniform diameter at said one surface.

8. A multiple control valve as defined in claim 7, wherein the ports are of smaller diameter than the passages.

9. A multiple lubrication control system, comprising: a receptacle for a lubricant; a multiple control valve for effecting the automatic distribution of said lubricant, said control valve including a distributor body, a housing mounted upon said distributor body containing a pressure chamber for said lubricant, a rotary valve disposed in said pressure chamber for distributing lubricant therefrom, said distributor body having a plurality of passages extending therethrough from one surface thereof, said passages being arranged with one end thereof starting at said one surface and being disposed upon a plurality of concentric circles, each of said concentric circles outwardly of the innermost thereof having a substantially greater diameter than its adjacent inner concentric circle whereby the passages disposed on each of said circles are radially spaced a substantial distance from the passages disposed on adjacent circles, said rotary valve having a seating surface rotatably mounted upon said one surface, said rotary valve having a pair of ports open to said pressure chamber to receive lubricant therefrom and arranged for registering with each of the passages on each of said plurality of circles, each of said pairs of ports extending through said rotary valve from said seating surface and being diametrically disposed on circles coinciding with the circles of said passages in said distributor body, and the remainder of said rotary valve in the region of said circles being imperforate; means for delivering said lubricant from said receptacle to said pressure chamber; means for effecting rotation of said valve to successively place each port in communication with the passages disposed on its associated circle to thereby distribute said lubricant to said passages, the substantial radial spacing between the passages on adjacent ones of said concentric circles being effective for a given rotational speed of said rotary valve so that each port on a relatively inner circle will move across each of its associated passages at a substantially slower rate than each port on a relatively outer circle will move across each of its associated passages, whereby for a given rotational speed of said rotary valve a substantially larger quantity of lubricant will flow from said pressure chamber into the passages of said relatively inner circle than will flow into the passages of said relatively outer circle; resilient means between said rotating means and said rotary valve for urging said seating face of said valve into engagement with said one body surface; and tubing connected with the other end of said passages for delivering said lubricant to said parts to be lubricated.

10. A multiple lubrication control system as defined in claim 9, wherein a pump is provided to pump the lubricant from the receptacle into the pressure chamber of the control valve.

11. A multiple lubrication control system as defined in claim 10, wherein a pressure relief valve is disposed between the pump and the pressure chamber.

12. In a multiple lubricant control system, a source of concentrated liquid lubricant; a source of water under pressure; means for forming a mixture of said concentrated liquid lubricant and said water in predetermined proportions; a multiple control valve for effecting the automatic distribution of said lubricant mixture, said control valve including a distributor body having a plurality of passages extending therethrough from one surface thereof for receiving lubricant mixture to be distributed, said passages being arranged on said one surface on a series of concentric circles, and each of said concentric circles outwardly of the innermost thereof having a substantially greater diameter than its adjacent inner concentric circle whereby the passages disposed on each of said circles are radially spaced a substantial distance from the passages disposed on adjacent circles; tubing communicating with said passages for delivering said lubricant mixture to said parts to be lubricated; a rotary valve having a seating face rotatably mounted on said one surface, said rotary valve having a pair of ports for the passages on each of said distributor body circles, each of said pairs of ports extending through said rotary valve from said seating face and being disposed on circles coinciding with the circles of the passages in said distributor body, the remainder of said rotary valve in the region of said circles being imperforate; a housing having a closed chamber for said lubricant mixture enclosing said rotary valve, all of said ports opening into said chamber to receive lubricant mixture therefrom; means for rotating said valve to successively place each port in communication with the passages disposed on its associated circle, resilient means between said rotating means and said rotary valve for urging said seating face of said valve into engagement with said one body surface; and means for delivering said lubricant mixture under pressure to said chamber, the substantial radial spacing between the passages on adjacent ones of said concentric circles being effective for a given rotational speed of said rotary valve so that each port on a relatively inner circle will move across each of its associated passages at a substantially slower rate than each port on a relatively outer circle will move across each of its associated passages, whereby for a given rotational speed of said rotary valve and for ports of generally the same diameter a substantially larger quantity of lubricant will flow from said pressure chamber into the passages of said relatively inner circle than will flow into the passages of said relatively outer circle.

13. A multiple lubrication control system, comprising: a receptacle for a concentrated liquid lubricant; means including an ejector, operable by water under pressure, communicating with said receptacle for withdrawing concentrated lubricant from said receptacle and forming a mixture of said concentrated lubricant and water in predetermined proportions; a multiple control valve for effecting the automatic distribution of said lubricant mixture, said control valve including a distributor body, a housing mounted upon said distributor body containing a pressure chamber for said lubricant mixture, and a rotary valve disposed in said pressure chamber for distributing lubricant therefrom, said distributor body having a plurality of passages extending therethrough from one surface thereof, said passages being arranged with one end thereof starting at said one surface and being disposed upon a plurality of concentric circles, each of said concentric circles outwardly of the innermost thereof having a substantially greater diameter than its adjacent inner concentric circle whereby the passages disposed on each of said circles are radially spaced a substantially distance from the passages disposed on adjacent circles, said rotary valve having a seating surface rotatably mounted upon said one surface and having at least one port for registering with each of the passages on each of said plurality of circles, each of said ports opening into said pressure chamber for receiving lubricant mixture therefrom, and extending through said rotary valve from said seating surface and being disposed on circles coinciding with the circles of said passages in said distributor body; means for delivering said lubricant mixture to said pressure chamber; means for effecting rotation of said rotary valve to successively place each port in communication with the passages disposed on its associated circle; resilient means between said rotating means and said rotary valve for urging said seating face of said valve into engagement with said one body surface; and tubing connected with the other end of said passages in said distributor body for delivering said lubricant mixture to said parts to be lubricated, the substantial radial spacing between the passages on adjacent ones of said concentric circles being effective for a given rotational speed of said rotary valve so that each port on a relatively inner circle will move across each of its associated passages at a substantially slower rate than each port on a relatively outer circle will move across each of its associated passages, whereby for a given rotational speed of said rotary valve and for ports of generally the same diameter a substantially larger quantity of lubricant will flow from said pressure chamber into the passages of said relatively inner circle than will flow into the passages of said relatively outer circle.

14. A multiple lubrication control system as defined in claim 13, wherein the tubing leading from at least one of said passages is connected to the tubing leading from at least one other of said passages upstream of the part to be lubricated, to effect an increased flow of lubricant to said part.

References Cited by the Examiner

UNITED STATES PATENTS

| | | | |
|---|---|---|---|
| 963,470 | 7/1910 | Du Pont | 137—625.11 |
| 1,954,105 | 4/1934 | Stoddard | 137—604 |
| 1,992,581 | 2/1935 | Reeder | 137—604 |
| 2,235,116 | 3/1941 | Ray | 103—262 |
| 2,516,425 | 7/1950 | Sarver | 137—625.11 |
| 2,789,573 | 4/1957 | Glass | 137—604 |
| 2,888,098 | 5/1959 | Florence. | |
| 2,964,061 | 12/1960 | Rawson et al. | 137—625.11 |
| 3,079,948 | 3/1963 | Allen | 137—625.11 |

FOREIGN PATENTS 594,180   3/1960   Canada.

LAVERNE D. GEIGER, *Primary Examiner.*

MILTON KAUFMAN, *Examiner.*